US011345201B2

United States Patent
Lacher et al.

(10) Patent No.: US 11,345,201 B2
(45) Date of Patent: May 31, 2022

(54) VEHICLE SUSPENSION WITH COUPLED, PIVOTING, OPPOSING SUPPORT LEGS

(71) Applicant: Baker Hughes Holdings LLC, Houston, TX (US)

(72) Inventors: André Lacher, Zurich (CH); Markus Daniel Humbel, Bubikon (CH); Remy Schmid, Winterthur (CH); Nitish Kumar Jha, Turgi (CH)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 0 days.

(21) Appl. No.: 17/196,332

(22) Filed: Mar. 9, 2021

(65) Prior Publication Data
US 2021/0300138 A1    Sep. 30, 2021

Related U.S. Application Data

(60) Provisional application No. 62/994,022, filed on Mar. 24, 2020.

(51) Int. Cl.
*B60G 7/00* (2006.01)
*B60G 11/50* (2006.01)
(Continued)

(52) U.S. Cl.
CPC ............. *B60G 7/001* (2013.01); *B60G 7/008* (2013.01); *B60G 11/50* (2013.01); *B60G 17/019* (2013.01);
(Continued)

(58) Field of Classification Search
CPC .... G01N 29/225; G01N 29/265; G01N 29/04; B60G 2204/11; B60G 2204/143;
(Continued)

(56) References Cited

U.S. PATENT DOCUMENTS

2012/0273284 A1*  11/2012  Nesnas .................. B62D 63/02
                                                                    180/7.5
2018/0080905 A1*  3/2018  Al Nahwi ............ B25J 15/0028
(Continued)

FOREIGN PATENT DOCUMENTS

CN          109571402 A  *  4/2019
CN          113267565 A  *  8/2021
(Continued)

OTHER PUBLICATIONS

International Search Report issued in the corresponding PCT counterpart of subject application PCT/US2021/022659 dated Jun. 30, 2021.

*Primary Examiner* — Paul N Dickson
*Assistant Examiner* — Matthew D Lee
(74) *Attorney, Agent, or Firm* — Mintz Levin Cohn Ferris Glovsky and Popeo, PC; Lisa Adams

(57) ABSTRACT

An autonomous vehicle and a suspension for the autonomous vehicle are provided. The suspension may include first and second support legs pivotally coupled to a body of the autonomous vehicle at respective pivot points, and extending in opposing directions to contact a surface upon which the autonomous vehicle moves. A biasing element biases the support legs towards the surface. A coupler couples the support legs to cause pivotal movement of one of the support legs to be mirrored in the other support leg. The coupler may cause the support legs to maintain a centerline, which extends equidistantly between the pivot points and through a sensor mounted to an underside of the body, perpendicular to the surface as the support legs pivot during movement of the autonomous vehicle.

20 Claims, 13 Drawing Sheets

(51) Int. Cl.
*B60L 13/04* (2006.01)
*B60G 17/019* (2006.01)

(52) U.S. Cl.
CPC ........ *B60L 13/04* (2013.01); *B60G 2202/122* (2013.01); *B60G 2202/13* (2013.01); *B60G 2204/11* (2013.01); *B60G 2204/143* (2013.01)

(58) Field of Classification Search
CPC .......... B60G 2202/13; B60G 2202/122; B60G 17/019; B60G 11/50; B60G 7/008; B60G 7/001; G01B 17/02; B60L 13/04; B60B 19/006; B25J 5/007
See application file for complete search history.

(56) References Cited

U.S. PATENT DOCUMENTS

| | | | |
|---|---|---|---|
| 2019/0015971 A1* | 1/2019 | Carrasco Zanini | ... B60B 19/006 |
| 2019/0054633 A1* | 2/2019 | Kossett | ................ B60K 17/043 |
| 2019/0329400 A1 | 10/2019 | Carrasco Zanini et al. | |

FOREIGN PATENT DOCUMENTS

| | | | | |
|---|---|---|---|---|
| JP | 2007130710 A | * | 5/2007 | |
| JP | 4670599 B2 | | 1/2011 | |
| KR | 101358343 B1 | * | 2/2014 | |

* cited by examiner

VEHICLE SUSPENSION WITH COUPLED, PIVOTING, OPPOSING SUPPORT LEGS

RELATED APPLICATION

This application claims priority under 35 U.S.C. § 119(e) to U.S. Provisional Application No. 62/994,022 filed Mar. 24, 2020, the entire contents of which are hereby expressly incorporated by reference herein.

BACKGROUND

The disclosure relates generally to autonomous vehicles, and more particularly, to a vehicle suspension that uses interconnected, opposing support legs to provide stability.

Autonomous vehicles are widely used to inspect industrial systems. The autonomous vehicles, also referred to as robots, can carry any of a variety of sensors to inspect the industrial systems, e.g., ultrasound or x-ray sensors to inspect material thickness, cameras to provide visual inspection, etc. In one example application, a small satellite autonomous vehicle can be carried by a drone and placed on a metal pipe that is otherwise inaccessible without great effort. The metal pipe has a curved outer surface and may turn in any number of directions, e.g., via elbows, T-sections, Y-sections, etc., along its length. In this setting, the autonomous vehicles are relatively small, e.g., 100×100× 100 millimeters, and light, e.g., less than 1.0 kilograms. In order to keep the autonomous vehicles small and light, the autonomous vehicles are oftentimes driven by a magnetic di-wheel drive, which includes a pair of spaced, magnetic wheeled drive units that can be operated to move the autonomous vehicle forward and rearward, and turn the autonomous vehicle. The magnetic wheel drive units maintain the autonomous vehicle on the metal surface of the pipe, but are unstable.

The sensors that are used on autonomous inspection vehicles can be highly sensitive and often times must be maintained in a proper orientation relative to the surface being inspected for proper operation and high quality data acquisition. For example, an ultrasound sensor used to measure a thickness of a metal pipe requires a perpendicular orientation to the metal pipe regardless of the curvature of the outer surface of the pipe, or the non-linear path of the pipe. Consequently, the autonomous inspection vehicles must be stable, which can be difficult with a magnetic di-wheel drive because of limitations of a two point support system.

Autonomous vehicles that employ magnetic di-wheel drives and require stable motion may include some form of support leg or outrigger to stabilize the autonomous vehicle's motion. One approach is to use a pair of leaf springs extending from the body of the autonomous vehicle to balance the autonomous vehicle about the di-wheel drive. The pair of leaf springs contact the support surface at ends thereof, and prevent the autonomous vehicle from tipping over. While this approach prevents the autonomous vehicle from completely tipping over, because the spring-loaded forces of the leaf springs act against one another, they cancel the balancing force that each provide. Consequently, acceleration or deceleration of the autonomous vehicle can create an at least temporary tilt or tipping of the autonomous vehicle that makes this type of suspension unusable for sensitive sensors because it does not provide sufficient stabilization.

SUMMARY

A first aspect of the disclosure provides an autonomous vehicle including a body, a di-wheel drive operatively coupled to the body and a suspension. The suspension can include a first support leg pivotally coupled to the body of the autonomous vehicle at a first pivot point. The first support leg can extend in a first direction from the body. The suspension can also include a second support leg pivotally coupled to the body of the autonomous vehicle at a second pivot point. The second support leg can extend in a second direction from the body that is substantially opposite to the first direction. Each support leg can include a surface contacting element to contact a surface such that the di-wheel drive and each support leg support the autonomous vehicle on the surface. The suspension can also include a coupler coupling the first support leg and the second support leg. The coupler can cause pivotal movement of one of the support legs to be mirrored in the other support leg. The suspension can also include a biasing element operatively coupled to at least one of the coupler, the first support leg and the second support leg to bias the first support leg and the second support leg pivotally toward contact with the surface. The autonomous vehicle can also include a controller operatively coupled to the di-wheel drive to control movement of the autonomous vehicle.

In one embodiment, the coupler can include a mechanical linkage operatively coupling the first support leg and the second support leg. In another embodiment, the biasing element can include at least one of: a torsion spring biasing at least one of the support legs, a magnet on an end of each of the support legs that contacts the surface, a tension spring coupling the support legs, and a compression spring between the body and at least one of the support legs. In another embodiment, the di-wheel drive can include a first magnetic, drive wheel unit and a second magnetic, drive wheel unit, each drive wheel unit having a drive axis, and wherein the first direction and the second direction are perpendicular to the drive axis of each drive wheel unit. In another embodiment, the autonomous vehicle can also include a sensor mounted to an underside of the body. A centerline can extend equidistantly between the first and second pivot points and through the sensor mounted to the underside of the body and the coupler can cause the first support leg and the second support leg to maintain the centerline perpendicular to the surface as the first and second support leg pivot during movement of the autonomous vehicle.

In another embodiment, the coupler can include a first gear on the first support leg and a second gear on the second support leg, wherein the first gear meshes with the second gear causing the pivotal movement of one of the support legs to be mirrored in the other support leg. In another embodiment, first and second pivot point can share a common axis, and the coupler can include a first arm pivotally coupled at a first end thereof to the first support leg at a distance from the common axis. The coupler can further include a second arm pivotally coupled at a first end thereof to the second support leg at the distance from the common axis. The coupler can also include an arm connection member pivotally coupled to a second end of the first arm and pivotally coupled to a second end of the second arm and the biasing element can be operatively coupled to the arm connection member to bias the first and second support legs pivotally toward contact with the surface.

In another embodiment, the first and second pivot point can share a common axis, and the coupler can include a first arm pivotally coupled at a first end thereof to the first support leg at a distance from the common axis. The coupler can also include a second arm pivotally coupled at a first end thereof to the second support leg at the distance from the common axis. The coupler can further include an arm connection guide pivotally coupling a second end of the first arm to a second end of the second arm. The arm connection can guide positioned in a linear guide and the biasing element is operatively coupled to the arm connection guide to bias the arm connection guide linearly to bias the first and second support legs pivotally toward contact with the surface.

In another embodiment, the coupler can include a first arm pivotally coupled at a first end thereof to the first support leg at a distance from the first pivot point. The coupler can also include a second arm pivotally coupled at a first end thereof to the second support leg at the distance from the second pivot point. The coupler can further include an arm connection guide pivotally coupling the first arm and the second arm, the arm connection guide positioned in a linear guide. The biasing element can be operatively coupled to the arm connection guide to bias the arm connection guide linearly to bias the first and second support legs pivotally toward contact with the surface.

In another embodiment, the biasing element can be operatively coupled to the first and second support legs to bias the first and second support legs pivotally toward contact with the surface and the biasing element can include one of a first torsion spring operatively coupled to bias the first support leg toward contact with the surface, a second torsion spring operatively coupled to bias the second support leg toward contact with the surface, and a tension spring operatively coupled to the first support leg and the second support leg to bias both support legs toward contact with the surface.

A second aspect of the disclosure provides a suspension for an autonomous vehicle having a di-wheel drive. The suspension can include a first support leg pivotally coupled to a body of the autonomous vehicle at a first pivot point. The first support leg can extend in a first direction from the body. The suspension can include a second support leg pivotally coupled to the body of the autonomous vehicle at a second pivot point. The second support leg can extend in a second direction from the body that is substantially opposite to the first direction. Each support leg can include a surface contacting element to contact a surface such that the di-wheel drive and each support leg can supports the autonomous vehicle on the surface. The suspension can also include a coupler coupling the first support leg and the second support leg. The coupler can cause pivotal movement of one of the support legs to be mirrored in the other support leg. The suspension can further include a biasing element operatively coupled to at least one of the coupler, the first support leg and the second support leg to bias the first support leg and the second support leg pivotally toward contact with the surface. A centerline can extend equidistantly between the first and second pivot points and through a sensor mounted to an underside of the body. The coupler can cause the first support leg and the second support leg to maintain the centerline perpendicular to the surface as the first and second support leg pivot during movement of the autonomous vehicle.

In one embodiment, the biasing element can include at least one of a torsion spring biasing at least one of the support legs, a magnet on an end of each of the support legs that contact the surface, a tension spring coupling the support legs, and a compression spring between the body and at least one of the support legs. In another embodiment, the coupler can include a first gear on the first support leg and a second gear on the second support leg. The first gear can mesh with the second gear, causing the pivotal movement of one of the support legs to be mirrored in the other support leg.

In another embodiment, the first and second pivot point can share a common axis, and the coupler can include a first arm pivotally coupled at a first end thereof to the first support leg at a distance from the common axis. The coupler can also include a second arm pivotally coupled at a first end thereof to the second support leg at the distance from the common axis. The coupler can further include an arm connection member pivotally coupled to a second end of the first arm and pivotally coupled to a second end of the second arm. The biasing element can be operatively coupled to the arm connection member to bias the first and second support legs pivotally toward contact with the surface. In another embodiment, the first and second pivot point can share a common axis, and the coupler can include a first arm pivotally coupled at a first end thereof to the first support leg at a distance from the common axis. The coupler can also include a second arm pivotally coupled at a first end thereof to the second support leg at the distance from the common axis. The coupler can further include an arm connection guide pivotally coupling a second end of the first arm to a second end of the second arm. The arm connection can guide positioned in a linear guide and the biasing element can be operatively coupled to the arm connection guide to bias the arm connection guide linearly to bias the first and second support legs pivotally toward contact with the surface.

In another embodiment, the coupler can include a first arm pivotally coupled at a first end thereof to the first support leg at a distance from the first pivot point. The coupler can also include a second arm pivotally coupled at a first end thereof to the second support leg at the distance from the second pivot point. The coupler can further include an arm connection guide pivotally coupling the first arm and the second arm, the arm connection guide positioned in a linear guide and the biasing element can be operatively coupled to the arm connection guide to bias the arm connection guide linearly to bias the first and second support legs pivotally toward contact with the surface.

In another embodiment, the biasing element can be operatively coupled to the first and second support legs to bias the first and second support legs pivotally toward contact with the surface. The biasing element can include one of a first torsion spring operatively coupled to bias the first support leg toward contact with the surface, a second torsion spring operatively coupled to bias the second support leg toward contact with the surface, and a tension spring operatively coupled to the first support leg and the second support leg to bias both support legs toward contact with the surface.

A third aspect of the disclosure provides a method. The method can include suspending an autonomous vehicle including a body and a di-wheel drive operatively coupled to the body on a surface using a suspension. The suspension can include a first support leg pivotally coupled to the body of the autonomous vehicle at a first pivot point. The first support leg can extend in a first direction from the body. The suspension can also include a second support leg pivotally coupled to the body of the autonomous vehicle at a second pivot point. The second support leg can extend in a second direction from the body that is substantially opposite to the first direction. Each support leg can include a surface contacting element to contact a surface such that the di-wheel drive and each support leg support the autonomous vehicle on the surface. The suspension can also include a coupler coupling the first support leg and the second support leg. The coupler can cause pivotal movement of one of the support legs to be mirrored in the other support leg. The suspension can further include a biasing element operatively coupled to at least one of the coupler, the first support leg, and the second support leg to bias the first support leg and the second support leg pivotally toward contact with the surface. The method can also include controlling operation of the di-wheel drive to control movement of the autonomous vehicle. The suspension can maintains a centerline extending equidistantly between the first and second pivot points perpendicular to the surface as the first and second support leg pivot during movement of the autonomous vehicle.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
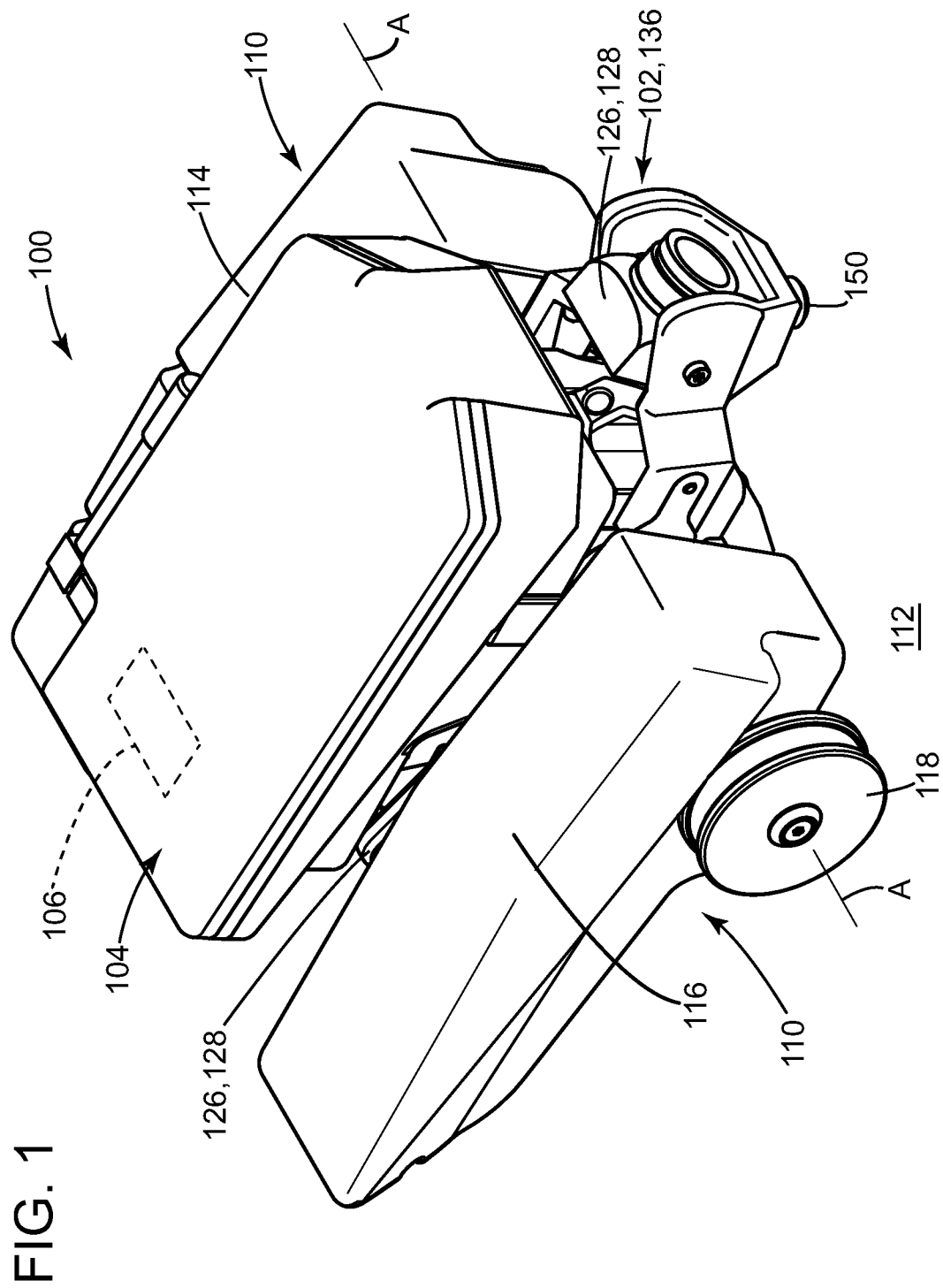
FIG. 1 shows a rear perspective view of an autonomous vehicle including a suspension according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology it will become necessary to select certain terminology when referring to and describing relevant machine components within an autonomous inspection vehicle, or robot. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. The terms "forward," and "rearward," without any further specificity, refer to directions, with "forward" referring to the front end of the autonomous vehicle, and "rearward" referring to the rearward end of the autonomous vehicle. It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof "Optional" or "optionally" means that the subsequently described event or circumstance may or may not occur, and that the description includes instances where the event occurs and instances where it does not.

Where an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides an autonomous vehicle and a suspension for the autonomous vehicle. The autonomous vehicle includes a di-wheel drive. The suspension may include at least one pair of opposing support legs pivotally coupled to the autonomous vehicle. Each pair of opposing support legs may include: a first support leg pivotally coupled to a body of the autonomous vehicle at a first pivot point, the first support leg extending in a first direction from the body, and a second support leg pivotally coupled to the body of the autonomous vehicle at a second pivot point. The second support leg extends in a second direction from the body that is substantially opposite to the first direction. Each support leg includes a surface contacting element, e.g., a pad, a magnet, a wheel, etc., to contact a surface such that the di-wheel drive and each support leg support the autonomous vehicle on the surface.

A coupler couples the first support leg and the second support leg. The coupler causes pivotal movement of one of the support legs to be mirrored in the other support leg, i.e., when one support leg pivots a certain angle, the other support leg pivots the same angle. A biasing element operatively couples to at least one of the coupler, the first support leg and the second support leg to bias the support legs pivotally toward contact with the surface to ensure surface contact. The coupler may cause the support legs to maintain a centerline, which extends equidistantly between the first and second pivot points and through a sensor mounted to an underside of the body, perpendicular to the surface as the support legs pivot during movement of the autonomous vehicle. Connecting the support legs such that they move together prevents the legs from canceling each other's balancing force. Consequently, the coupler ensures the support leg forces remain balanced, and thus prevents any temporary tilting or tipping of the autonomous vehicle during acceleration and deceleration, making the autonomous vehicle more stable and ensuring the sensor is aimed in a consistent and as-intended manner. The suspension also allows the autonomous vehicle to follow any curvature of a surface such as an outer surface of a circular metal pipe that also turns along its length. The autonomous vehicle can also be smaller than prior autonomous vehicles but still allows full maneuverability on surfaces that are convex and with small radii, e.g., 100 millimeters, compared to conventional systems that are limited to minimum 200 mm radii. The smaller size enables easier use of the autonomous vehicle with a drone for delivery to difficult to reach locations.

Figure 2:
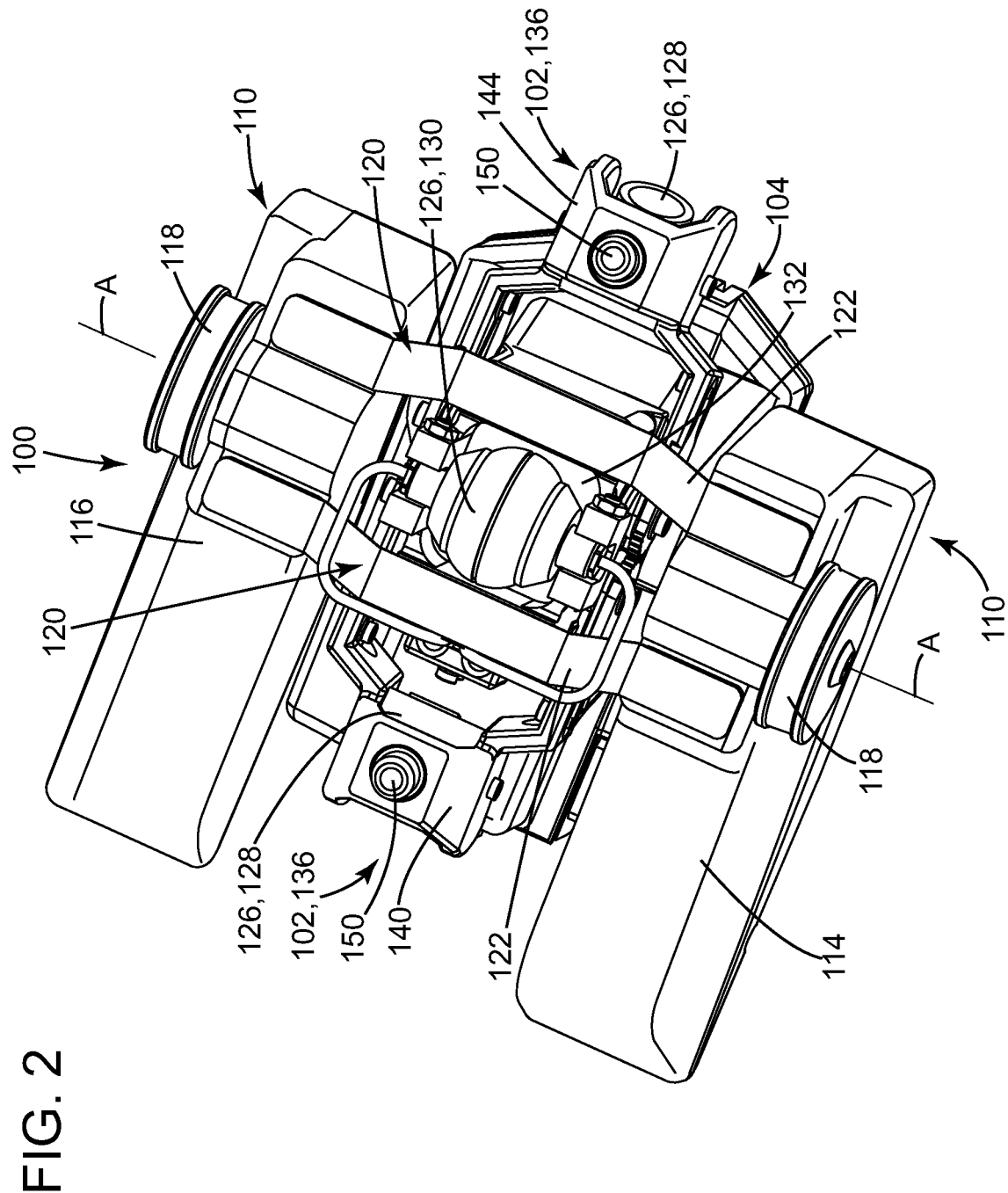
FIG. 2 shows a bottom perspective view of an autonomous vehicle including a suspension according to embodiments of the disclosure.
Figure 3:
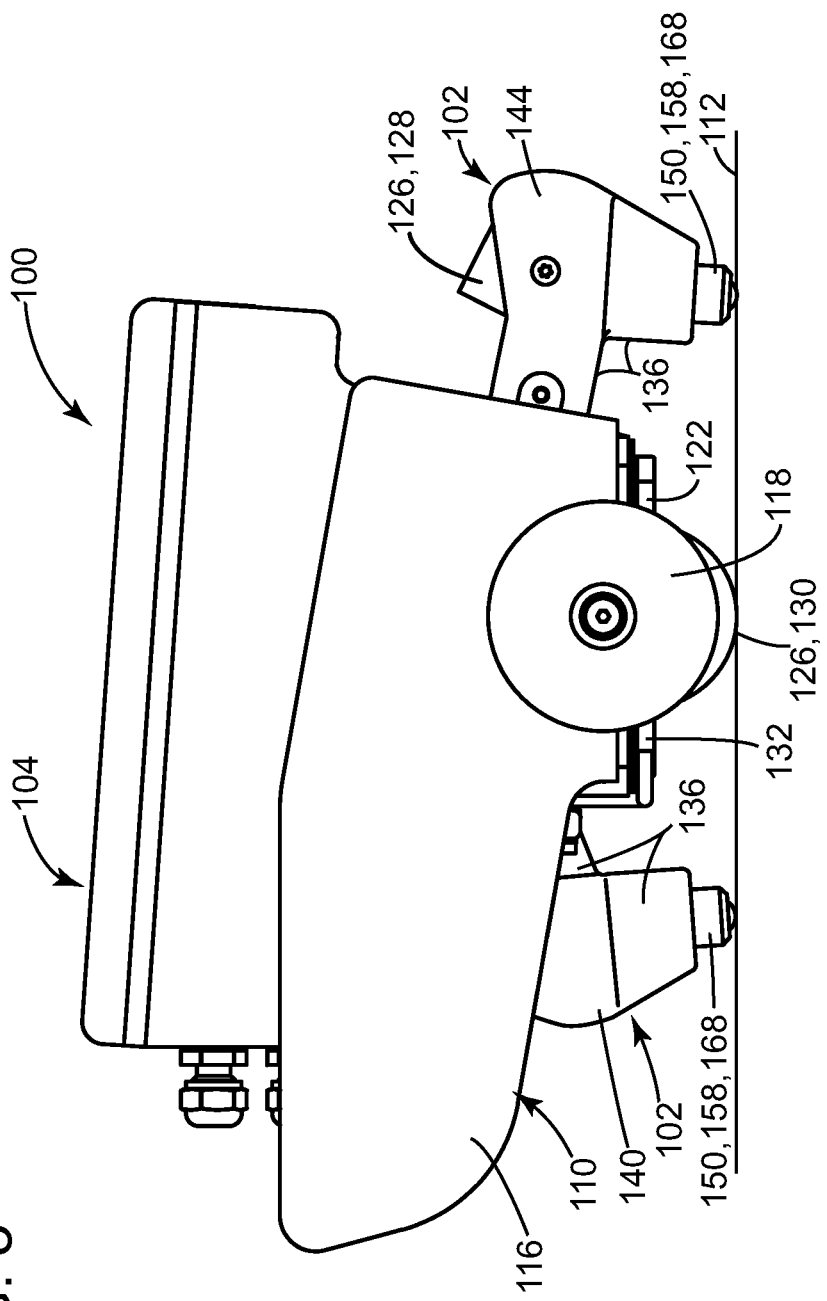
FIG. 3 shows a left side view of an autonomous vehicle including a suspension according to embodiments of the disclosure.
Figure 4:
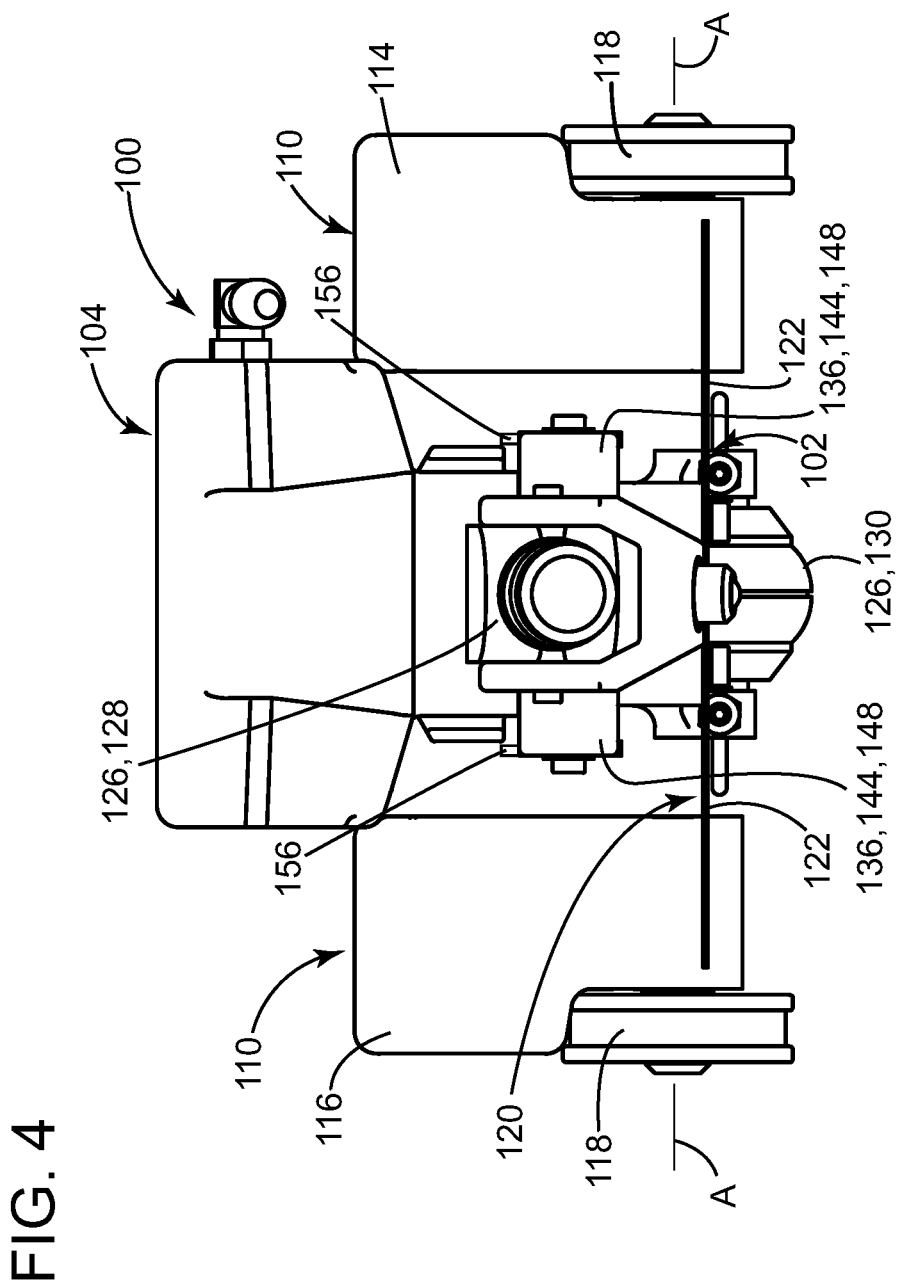
FIG. 4 shows a rear view of an autonomous vehicle including a suspension according to embodiments of the disclosure.

Referring to the drawings, FIGS. 1-4 show various views of an autonomous vehicle 100 according to embodiments of the disclosure. More particularly, FIG. 1 shows a rear perspective view, FIG. 2 shows a bottom perspective view, FIG. 3 shows a left side view, and FIG. 4 shows a rear view, of autonomous vehicle 100. As will be described in greater detail, autonomous vehicle 100 includes a suspension 102 (only partially shown in each of FIGS. 1-4) according to embodiments of the disclosure. Autonomous vehicle 100 may include a body 104. Body 104 may include any chassis, compartment, or other base equipment of autonomous vehicle 100. In the example shown, body 104 may include a compartment that houses electronics such as a controller 106 (in phantom in FIG. 1), communication system or other circuitry. Body 104 may also support a di-wheel drive 110 that powers movement of autonomous vehicle 100 over a surface 112 (FIG. 1). Di-wheel drive 110 is operatively coupled to body 104 to propel autonomous vehicle 100. Di-wheel drive 110 may include any now known or later developed two wheel drive. In the example shown, di-wheel drive 110 includes a first magnetic, drive wheel unit 114 and a second magnetic, drive wheel unit 116. Each drive wheel unit 114, 116 has magnetic wheel 118 to hold autonomous vehicle 100 to surface 112 and power movement of autonomous vehicle 100 across surface 112. As shown best in FIG. 4, each drive wheel unit 114, 116 has a drive axis A. As understood in the art, wheels 118 can turn in the same direction and with the same velocity to move autonomous vehicle 100 forward or rearward in a straight line, and may turn in different directions and/or with different velocity to move autonomous vehicle 100 in a curved path and/or retain it on an uneven, curved or non-planar surface. In addition, wheels 118 may move to balance autonomous vehicle 100 using tilt sensors and/or gyroscope sensors to control turning of wheels 118 forward or backward as needed to maintain its pitch at upright. Despite this balancing, autonomous vehicle 100 may tilt during acceleration and/or deceleration, and on certain curved surfaces, in such a manner to make it unstable for use as an autonomous inspection vehicle on these surfaces.

In the example shown, each drive wheel unit 114, 116 may be mounted to body with a flexible suspension 120, e.g., including a pair of leaf springs 122 that flexibly position each drive wheel unit 114, 116 to body 104. In this manner, each drive wheel unit 114, 116 may move independently of body 104. While a particular type of di-wheel drive 110 has been illustrated, it is emphasized that the teachings of the disclosure may be applied with a variety of other di-wheel drives. For example, a single drive wheel unit may be employed to drive two magnetic wheels 118 perhaps with a single, shared axis for each wheel, or drive wheel units 114, 116 may share a common axis but with separate axes, or drive wheel units 114, 116 may be mounted to body 104 with an inflexible or fixed suspension, etc. Autonomous vehicle 100 may include any now known or later developed controller 106 (shown in phantom in FIG. 1) operatively coupled to di-wheel drive 110 to control movement of autonomous vehicle 100, e.g., capable of control from a remote location either through wireless communication and/or a tether wire.

Autonomous vehicle 100 may be employed as an autonomous inspection vehicle or robot, i.e., one that inspects surface 112. In this case, autonomous vehicle 100 may include any number and variety of sensors 126 for inspection. For example, a sensor 126 may include a camera 128, e.g., visual, infrared, night-vision or other type of camera. In the example shown, autonomous vehicle 100 includes a forward and rearward facing camera 128. In addition thereto or alternatively, as shown best in FIGS. 2 and 4, sensor 126 may include a penetrating type sensor 130 such as an ultrasonic sensor, an X-ray sensor, or other type of penetrating sensor. As understood in the art, each type of sensor 126 may obtain measurements or other data that can be stored on autonomous vehicle 100 and/or transmitted to a central control system (not shown) for later analysis. It is oftentimes desired to maintain sensors 126 in a particular orientation relative to surface 112. In one example, sensor 130 may include an ultrasonic sensor capable of obtaining a thickness of surface 112, e.g., in the form of a wall of a metal pipe. Here, sensor 130 may be mounted to an underside 132 (FIG. 2) of body 104, but this position is not necessary in all instances. An ultrasonic sensor works best when perpendicular to surface 112. Consequently, sensor 130 is mounted to body 104 in a manner that it will be perpendicular to surface 112 during operation. Other sensors 126 may have other orientations that need to be maintained during operation. Suspension 102 according to embodiments of the disclosure maintains the intended orientation of body 104, and thus any sensors 126 thereon relative to surface 112 in a stable manner compared to conventional suspensions.

Figure 5:
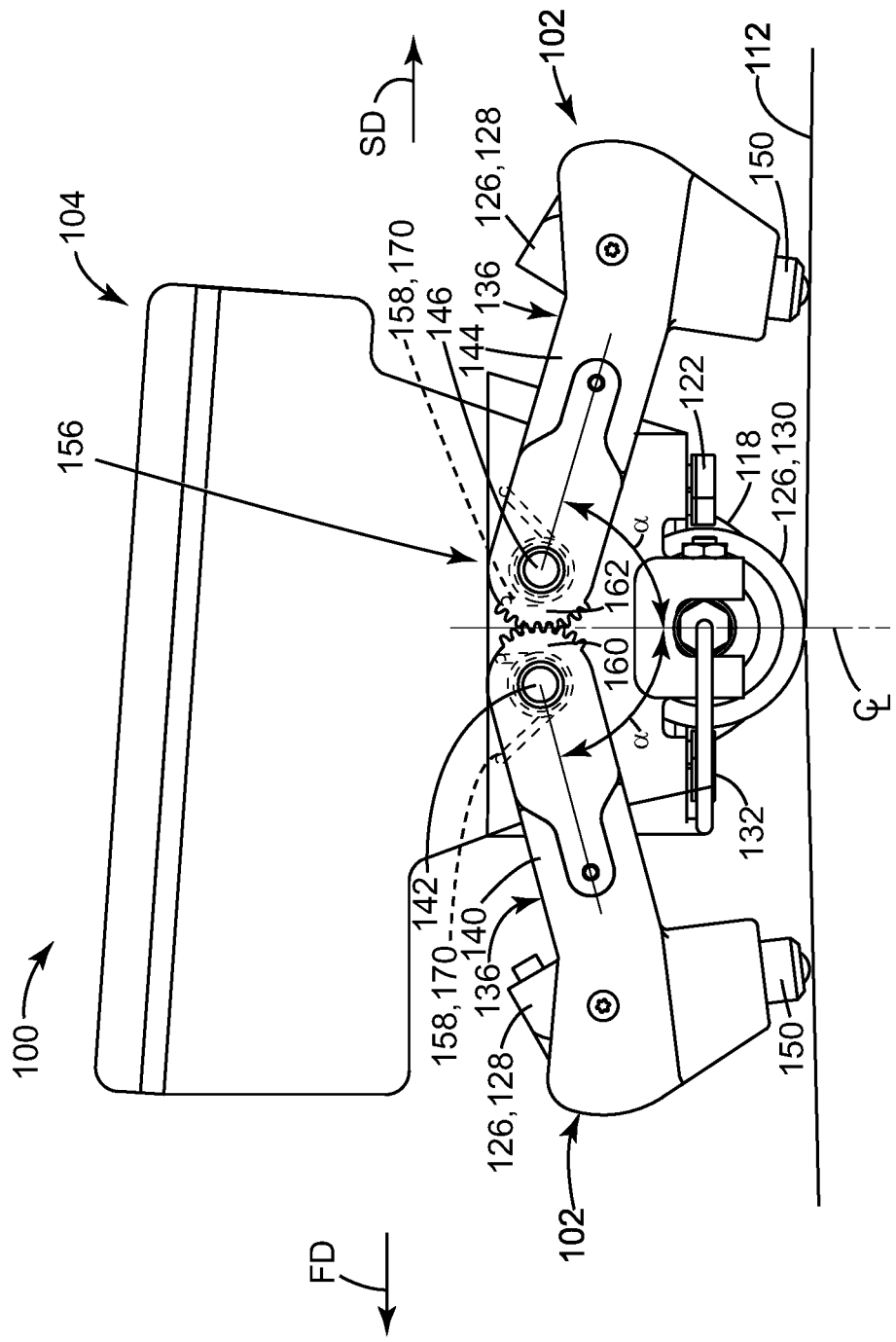
FIG. 5 shows a side view of an autonomous vehicle with drive wheel units removed and illustrating a suspension on a relatively planar surface, according to embodiments of the disclosure.
Figure 6:
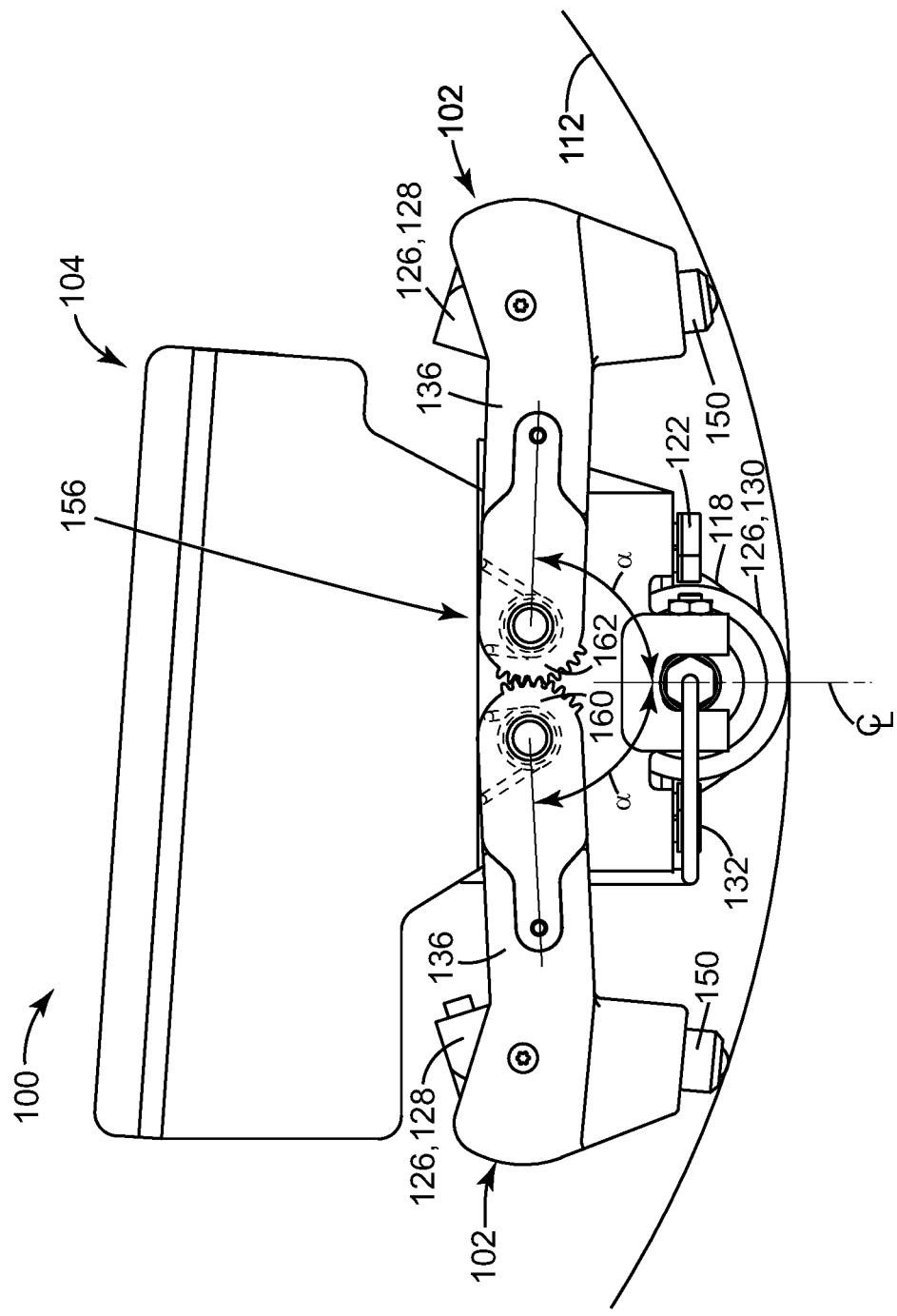
FIG. 6 shows a side view of an autonomous vehicle with drive wheel units removed and illustrating a suspension on a concave surface, according to embodiments of the disclosure.
Figure 7:
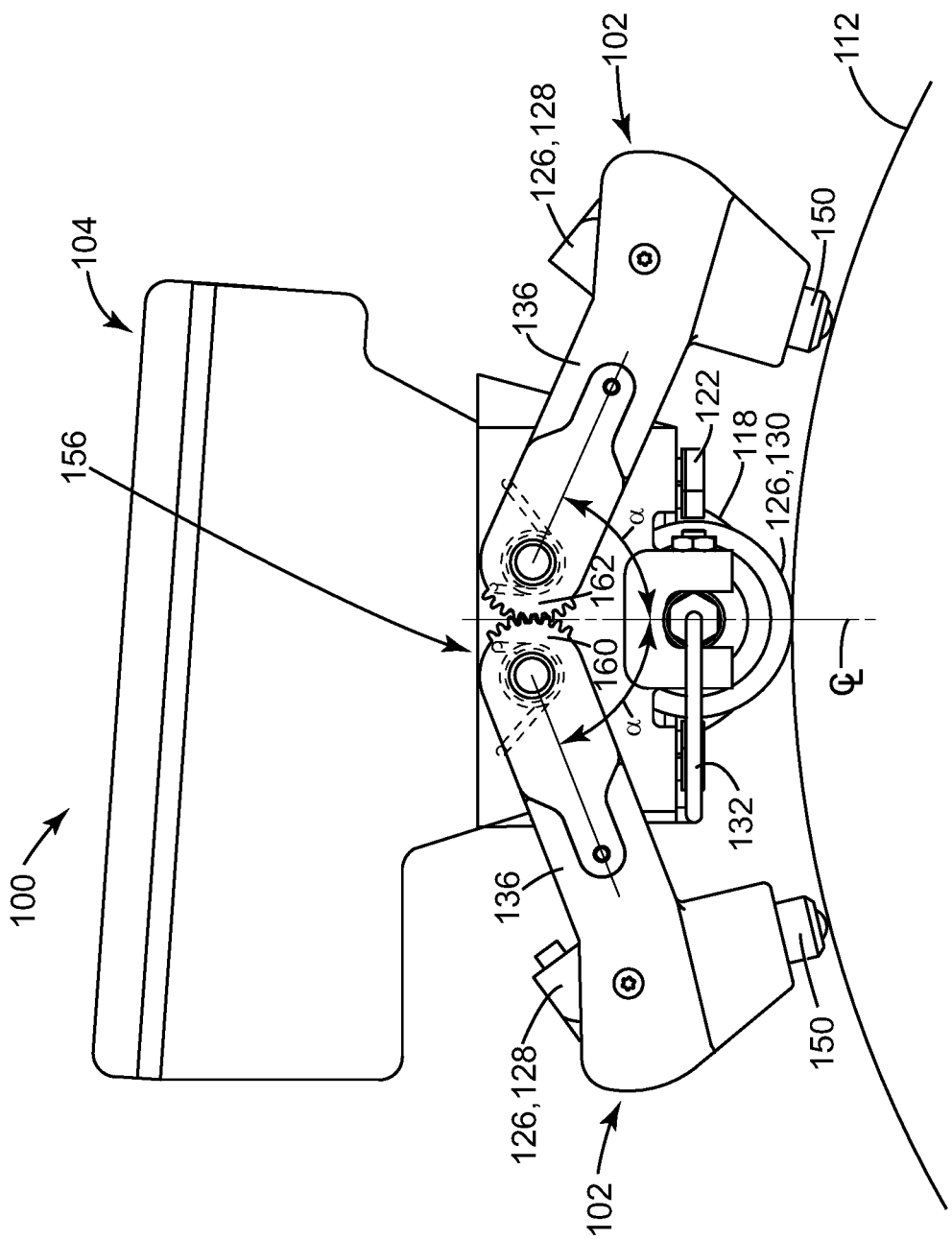
FIG. 7 shows a side view of an autonomous vehicle with drive wheel units removed and illustrating a suspension on a convex surface, according to embodiments of the disclosure.

FIGS. 5-7 show various side views of autonomous vehicle 100 with drive wheel units 114, 116 (FIG. 4) removed and showing one embodiment of suspension 102 according to embodiments of the disclosure. FIG. 5 shows autonomous vehicle 100 on surface 112 that is generally planar, slightly convex; FIG. 6 shows autonomous vehicle 100 on surface 112 that is concave; and FIG. 7 shows autonomous vehicle 100 on surface 112 that is more convex compared to FIG. 5. In the examples shown in FIGS. 5-7, surface 112 may be an outer surface of a metal pipe or other structure having a circular or curved outer surface. Suspension 102 according to various embodiments of the disclosure may include at least one pair of opposing support legs 136 pivotally coupled to body 104. Each pair of opposing support legs 136 includes a first support leg 140 pivotally coupled to body 104 of autonomous vehicle 100 at a first pivot point 142. First support leg 140 extends in a first direction FD from body 100, e.g., in the example shown leftward, which may be a forward direction of autonomous vehicle 100 for purposes of description. Each pair of opposing legs 136 may also include a second support leg 144 pivotally coupled to body 104 of autonomous vehicle 100 at a second pivot point 146. Second support leg 144 extends in a second direction SD from body 104 that is substantially opposite to first direction FD, e.g., in the example shown rightward, which may be a rearward direction of autonomous vehicle 100 for purposes of description. First direction FD and second direction SD are generally perpendicular to drive axis A of each drive wheel unit 114, 116. "Substantially opposite" as used herein indicates that the directions are within perhaps +/−2° from 180° of one another. Pivot points 142, 146 may be provided in any now known or later developed fashion such as but not limited to a pivot pin and/or bearing mounted to body 104, or an intervening structure coupled to body 104 that pivotally supports each respective leg 140, 144.

Figure 8:
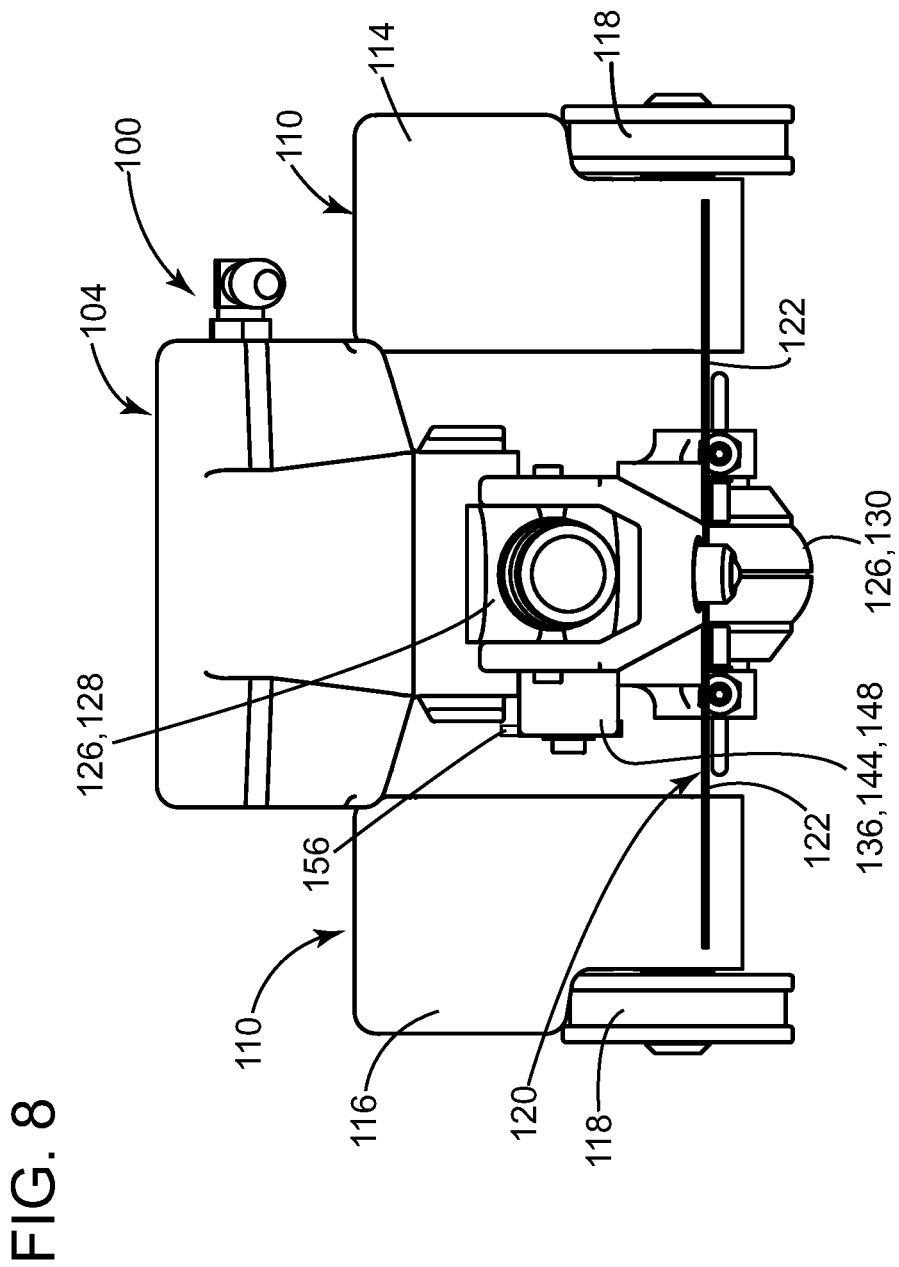
FIG. 8 shows a rear view of an autonomous vehicle including a suspension according to another embodiment of the disclosure.

Referring to FIGS. 4 and 8, each support leg 140, 144 may include a pair of leg structures 148 that pivotally couple to body 104, as shown in FIG. 4, or a single leg structure 148, as shown in FIG. 8, pivotally coupled to body 104. Support legs 140, 144 and leg structure(s) 148 thereof may have any shape required to provide the functions described herein. Leg structures 148 may be angled or bent as shown in FIG. 8 in any manner necessary for proper positioning. As illustrated in FIG. 4, leg structures 148 may include bends therein to allow support for, for example, camera 128. In most cases, for example as shown in the side view of FIGS. 5-7, support legs 140, 144 have been illustrated in a generally L-shaped form when viewed from the side, but as will be apparent, this is not necessary in all instances because other shapes are possible, e.g., arcs, straight, etc.

Each support leg 140, 144 includes a surface contacting element 150 to contact surface 112 such that di-wheel drive 110 and each support leg 140, 144 support autonomous vehicle 100 on surface 112. Di-wheel drive 110 and support legs 140, 144 provide a four point, stable support system for autonomous vehicle 100. In some cases, sensor 130 may also contact surface 112 for support, but this is not necessary. Surface contacting element 150 may take any of a variety of forms. In one embodiment, surface contacting element 150 may include, as shown in FIG. 3, magnets 168 to assist in pivoting support legs 140, 144 into contact with surface 112 when the surface includes a ferromagnetic metal. Alternatively, surface contacting element 150 may provide non-magnetic contacting support. Surface contacting element 150 may take a variety of physical forms. For example, surface contacting element 150 may include any one or more of the following: a pad member (e.g., FIG. 9) made of a material that is slidable on surface 112 such as a polymer, a wheel (e.g., FIG. 12), a magnetic wheel (FIG. 11), a roller bearing (e.g., FIGS. 5-7), or another form of surface contacting structure that is movable over surface 112 as autonomous vehicle 100 moves thereover.

As shown in FIGS. 5-7, suspension 100 may also include a coupler 156 coupling first support leg 140 and second support leg 144. Coupler 156 may include any form of structure that causes pivotal movement of one of the support legs 140, 144 to be mirrored in the other support leg 140, 144. As will be described in greater detail, suspension 102 may also include a biasing element 158 operatively coupled to at least one of coupler 156, first support leg 140 and second support leg 144 to bias first support leg 140 and second support leg 144 pivotally toward contact with surface 112, i.e., away from body 104. In FIGS. 5-7, coupler 156 includes a first gear 160 on first support leg 140, e.g., near first pivot point 142, and a second gear 162 on second support leg 144, e.g., near second pivot point 146. First gear 160 extends about first pivot point 142, and second gear extends about second pivot point 146. Each gear 160, 162 is concentric with respective pivot points 142, 146. Each gear 160, 162 may include a number of gear teeth arrayed in an arc such that first gear 160 meshes with second gear 162 causing the pivotal movement of one of the support legs to be mirrored in the other support leg. As used herein, "mirrored" indicates corresponding or reflected pivotal movement. For example, when one leg pivots downwardly 5°, the other leg also pivots downwardly 5°, or when one leg pivots upwardly 2°, the other leg pivots upwardly 2°. Hence, pivoting of one leg 140, 144 is transferred to the other leg 140, 144 by gears 160, 162.

In the example shown in FIGS. 5-7, suspension 102 is configured to maintain autonomous vehicle 100 and more particularly, sensor 130 perpendicular to surface 112. To illustrate, a centerline CL may extend equidistantly between first and second pivot points 142, 146. Centerline CL may also extend, in the examples shown, through sensor 130 mounted to underside 132 of body 104 and/or axis A (FIG. 4) of wheels 118. Here, support legs 140, 144 are positioned to ensure centerline, and hence sensor 130, is perpendicular to surface 112. Coupler 156 causes first support leg 140 and second support leg 144 to maintain centerline CL perpendicular to surface 112 as first and second support legs 140, 144 pivot during movement of autonomous vehicle 100. That is, as observed by comparing FIGS. 5-7, coupler 156 maintains an angle α of each support leg 140, 144 relative to a centerline CL the same regardless of the shape of surface 112. FIG. 5 shows autonomous vehicle 100 on surface 112 that is relatively flat, somewhat convex, and angle α is the same for both support legs 140, 144. FIG. 6 shows autonomous vehicle 100 on surface 112 that is concave, like in an inner part of an elbow of a pipe, and angle α is the same for both support legs 140, 144. In FIG. 6, the angle is larger than shown in FIG. 5 because support legs 140, 144 have pivoted upwards with the concavity of surface 112 to maintain contact. FIG. 7 shows autonomous vehicle 100 on surface 112 that is convex, like an outer part of an elbow of a pipe, and angle α is the same for both support legs 140, 144. In FIG. 7, the angle is smaller than shown in FIG. 5 because support legs 140, 144 have pivoted downwardly with the convexity of surface 112 to maintain contact. It is noted with emphasis that surface 112 also may be concave or convex into or out of the page. For example, the positions shown may be of a surface 112 of a circular pipe that has a planar path in FIG. 5, a concave path in FIG. 6, or a convex path in FIG. 7. Suspension 102 also maintains the perpendicular position of autonomous vehicle 100 and sensor 130 despite the curvature into and out of the page. Suspension 102 prevents tilting or tipping of autonomous vehicle 100 and sensor 130 during, for example, acceleration or deceleration of autonomous vehicle 100 and movement about the variety of curved surfaces, making the autonomous vehicle more stable and ensuring sensor's 130 readings are accurate.

It is noted that suspension 102 may also be configured to maintain autonomous vehicle 100 and/or a sensor 126 at an angle other than perpendicular to surface 112. In this case, the angles α for each support leg 140, 144 may not be the same because, for example, sensor 126 requires a non-perpendicular aim at surface 112. In this case, the pivotal movement of support legs 140, 144 is such that the movement of autonomous vehicle 100 does not cause the angles α to be the same, but suspension 102 still prevents tilting and/or tipping and retention of the desired sensor 126 angle relative to surface 112.

As noted, suspension 102 may also include biasing element 158 operatively coupled to at least one of coupler 156, first support leg 140 and second support leg 144 to bias first support leg 140 and second support leg 144 pivotally toward contact with surface 112, i.e., away from body 104. Biasing element 158 may take a variety of forms depending, for example, on the type of coupler 156. In one embodiment, shown for example in FIG. 3, biasing element 158 may include surface contacting element 150 including magnets 168 to assist in pivoting support legs 140, 144 into contact with surface 112 when the surface is in the form a ferromagnetic metal. That is, biasing element 158 includes magnet 168 on an end (opposing body 104) of each of support legs 140, 144 that contacts surface 112. As shown in FIGS. 5-7 and 12, in another embodiment, biasing element 158 may include a torsion spring 170 (170A-B in FIG. 12) biasing at least one of support legs 140, 144 away from body 104 and towards surface 112. In FIGS. 5-7, torsion spring 170 has one end fixed, for example, on body 104 and another end biasing the legs toward contact surface 112, i.e., away from body 104. It is noted that while two torsion springs 170 are shown, a single torsion spring 170 on either leg would inherently work on both legs because legs 140, 144 are coupled together by coupler 156. As will be described herein, biasing element 158 may also include, as shown for example in FIG. 9, a compression spring 400 arranged in some manner between body 104 and support leg(s) 140, 144. Alternatively, as shown in FIG. 13, biasing element 158 may include a tension spring 410 operatively coupled to support legs 140, 144, i.e., to first support leg 140 and second support leg 144 to bias both support legs toward contact with the surface 112.

Referring to FIGS. 9-13, schematic side views of a variety of couplers 356 are shown. In these embodiments, coupler 356 may include a mechanical linkage 380 operatively coupling first support leg 140 and second support leg 144. Mechanical linkage 380 may also couple to body 104 or some intermediate or intervening structure that couples to body 104. In this regard, in FIGS. 9-13, a rectangular box is labeled and will be referred to as body 104 for clarity. It is noted however that the rectangular box could also represent some form of intermediate or intervening structure that mounts coupler 356 to body 104.

Figure 9:
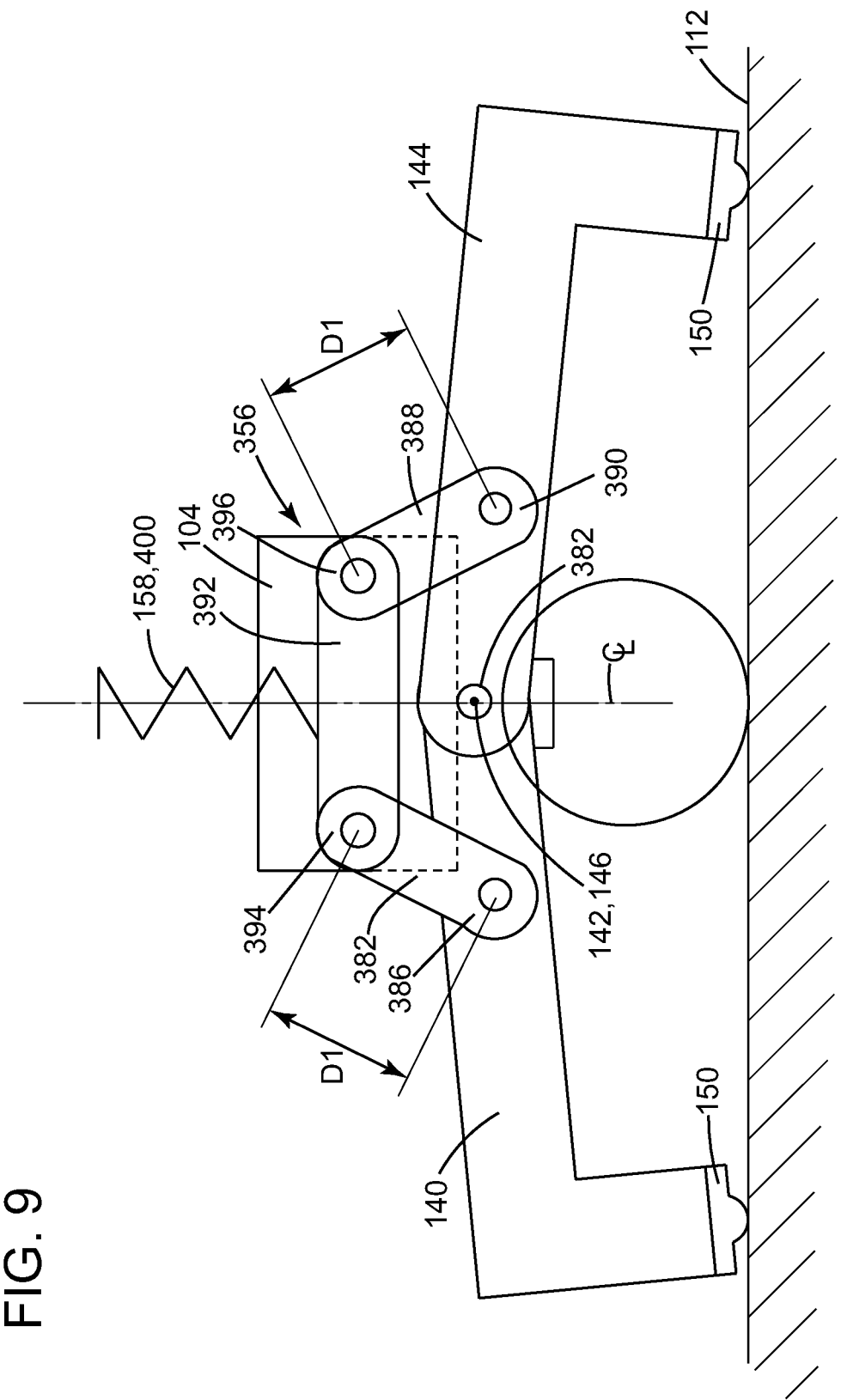
FIG. 9 shows a schematic side view of a suspension according to other alternative embodiments of the disclosure.
Figure 10:
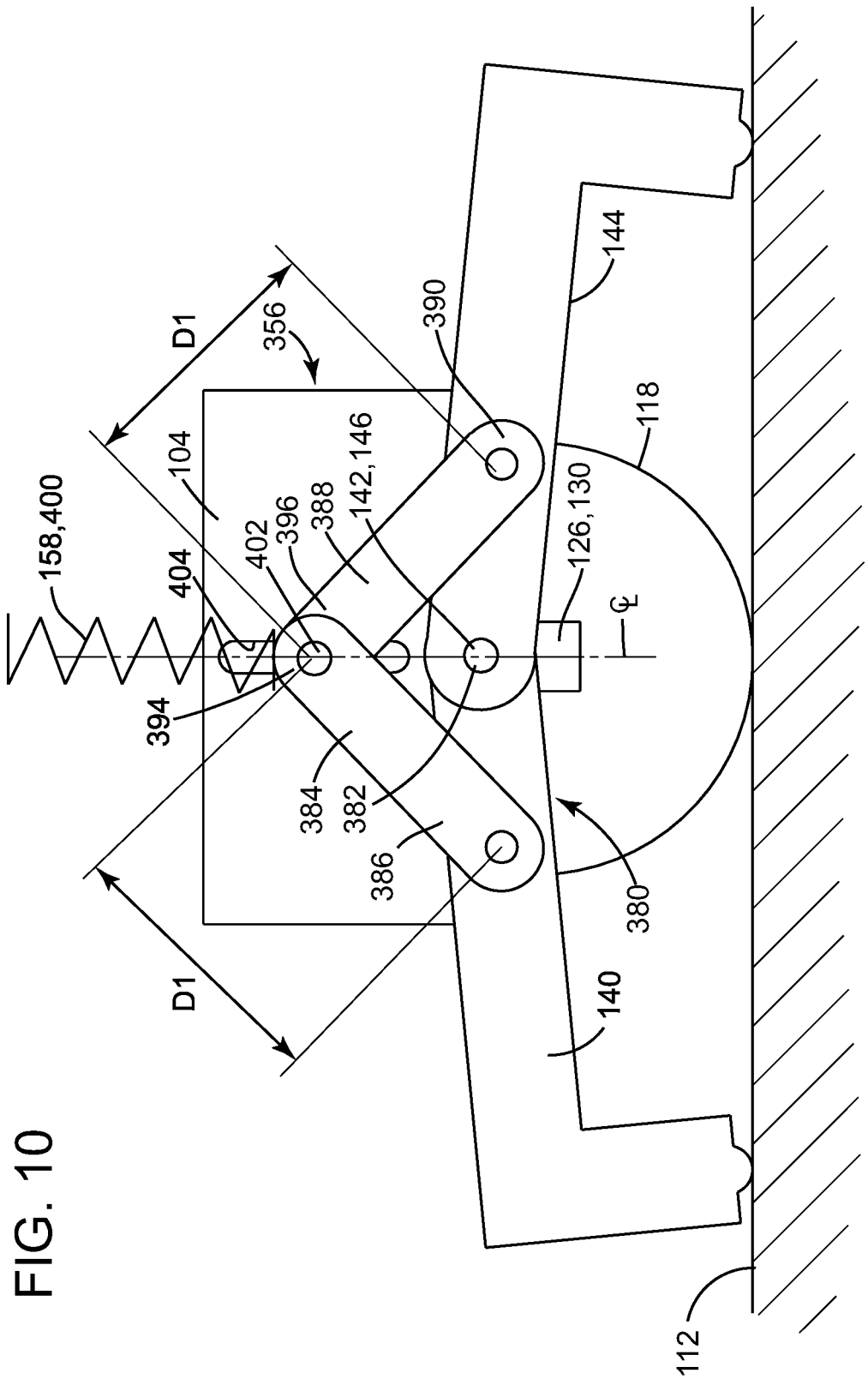
FIG. 10 shows a schematic side view of a suspension according to additional embodiments of the disclosure.

In FIGS. 9 and 10, first and second pivot points 142, 146 share a common axis 382. That is, they are co-axial with a common pivot pin (i.e., 382) with body 104. Here, coupler 356 includes a first arm 384 pivotally coupled at a first end 386 thereof to first support leg 140 at a distance (D1) from common axis 382, and a second arm 388 pivotally coupled at a first end 390 thereof to second support leg 144 at the distance (D1) from common axis 382. Each arm 384, 388 may be pivotally coupled to each leg 140, 144 by any appropriate pin and/or bearing. In FIG. 9, an arm connection member 392 is pivotally coupled to a second end 394 of first arm 384 and pivotally coupled to a second end 396 of second arm 388. Biasing element 158 is operatively coupled to arm connection member 392 to bias, via first and second arms 384, 388, first and second support legs 140, 144 pivotally toward contact with surface 112, i.e., away from body 104. Here, arm connection member 392 presses against arms 384, 388 which press against respective support legs 140, 144. Biasing element 158 may include, for example, a compression spring 400 that forces arm connection member 392 towards surface 112 and hence forces first and second arm 384, 388 to force first and second support legs 140, 144 towards surface 112. Here, compression spring 400 is above arm connection member 392. It will be readily recognized that a tension spring (not shown) could similarly pull arm connection member 392 down from below to provide the same effect. Arm connection member 392 does not interfere with common axis 382.

In another embodiment, shown in FIG. 10, coupler 356 does not include arm connection member 392 (FIG. 9). Rather, coupler 356 includes an arm connection guide 402 pivotally coupling a second end 394 of first arm 384 to a second end 396 of second arm 388 with arm connection guide 402 positioned in a linear guide 404. Here, arm connection guide 402 may include a pin and/or bearing that can move linearly in linear guide 404, and allow pivoting of arms 384, 388. Linear guide 404 may be in body 104 or intervening structure with coupler 356. In this example, linear guide 404 is above common axis 382 of first and second pivot points 142, 146. Biasing element 158 is operatively coupled to arm connection guide 402 to bias first and second support legs 140, 144 pivotally toward contact with surface 112, i.e. away from body 104. Biasing element 158 may include, for example, compression spring 400 that forces arm connection guide 402 towards surface 112 and hence forces first and second arm 384, 388 to force first and second support legs 140, 144 towards surface 112. That is, biasing element 158 is operatively coupled to arm connection guide 402 to bias the arm connection guide linearly (using linear guide 404) to bias first and second support legs 140, 144 pivotally toward contact with the surface 112. It will be readily recognized that a tension spring (not shown) could similarly pull arm connection guide 402 down from below to provide the same effect. While first and second arms 384, 388 are shown with a particular length, they may extend beyond arm connection guide 402 and pivotally couple to other arms, e.g., in the form of a scissor or parallelogram linkage.

Figure 11:
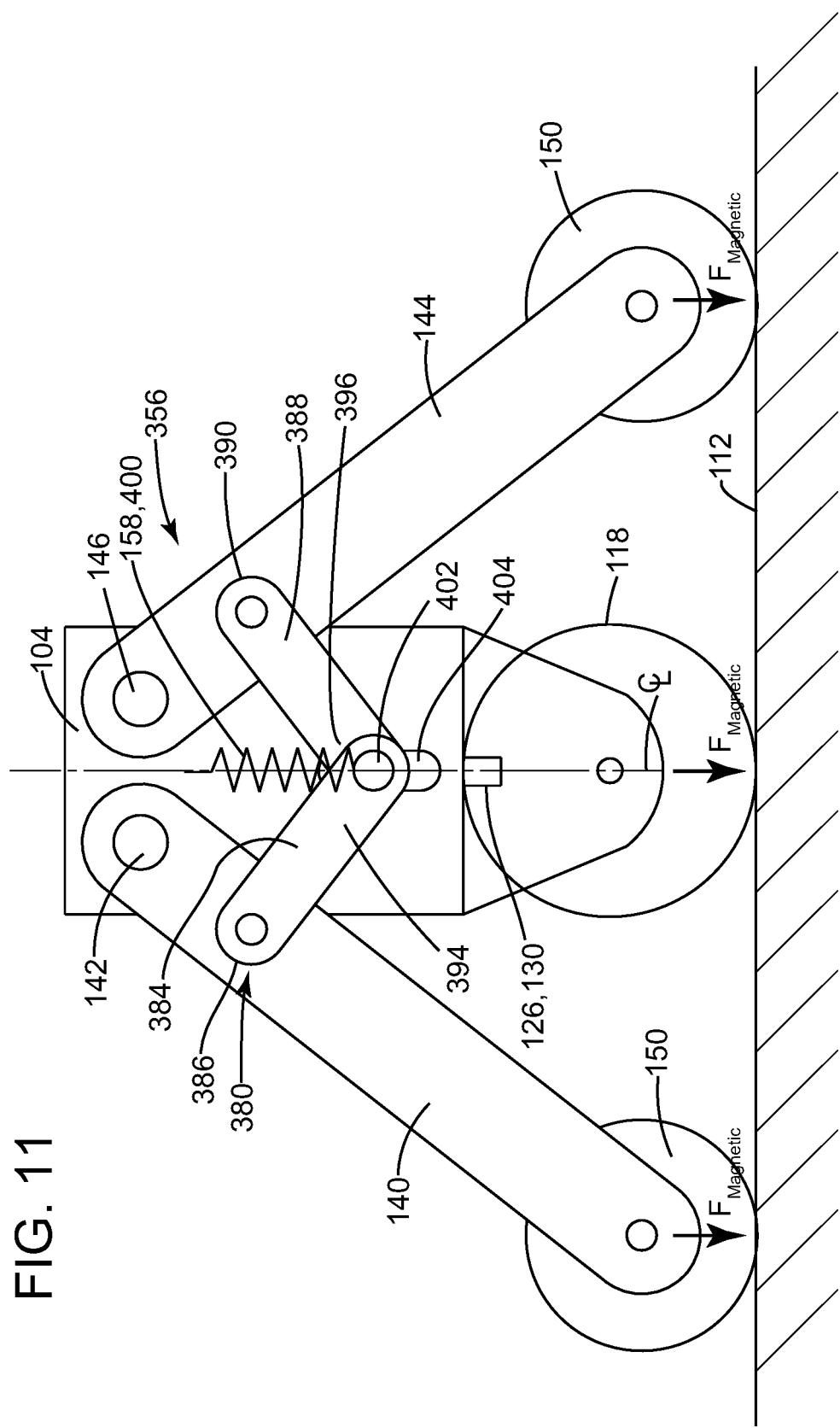
FIG. 11 shows a schematic side view of a suspension according to other alternative embodiments of the disclosure.

Referring to FIG. 11, another embodiment of a coupler 356 is shown that is similar to that of FIG. 10, except pivot points 142, 146 are separate, and linear guide 404 is below the pivot points. Here, coupler 356 may include first arm 384 pivotally coupled at first end 386 thereof to first support leg 140 at a distance (D2) from first pivot point 142, and second arm 388 pivotally coupled at first end 390 thereof to second support leg 144 at the distance (D2) from second pivot point 144. Each arm 384, 388 may be pivotally coupled to each support leg 140, 144 by any appropriate pin and/or bearing. In this embodiment, arm connection guide 402 pivotally couples first arm 384 and second arm 388, i.e., at second end 394 of first arm 384 to second end 396 of second arm 388. Arm connection guide 402 is positioned in linear guide 404. In this example, linear guide 404 is below first and second pivot points 142, 146. Here, arm connection guide 402 may include a pin and/or bearing that can move linearly in linear guide 404. Linear guide 404 may be in body 104 or intervening structure with coupler 356. Biasing element 158 is operatively coupled to arm connection guide 402 to bias first and second support legs 140, 144 pivotally toward contact with surface 112, i.e., away from body 104. Biasing element 158 may include, for example, compression spring 400 that forces arm connection guide 402 towards surface 112 and hence forces first and second arm 384, 388 to force first and second support legs 140, 144 towards surface 112. That is, biasing element 158 is operatively coupled to arm connection guide 402 to bias the arm connection guide linearly to bias first and second support legs 140, 144 pivotally toward contact with the surface 112. It will be readily recognized that a tension spring (not shown) could similarly pull arm connection guide 402 down from below to provide the same effect. FIG. 11 also shows surface contacting element 150 in the form of a magnetic wheel that each apply a force $F_{magnetic}$.

Figure 12:
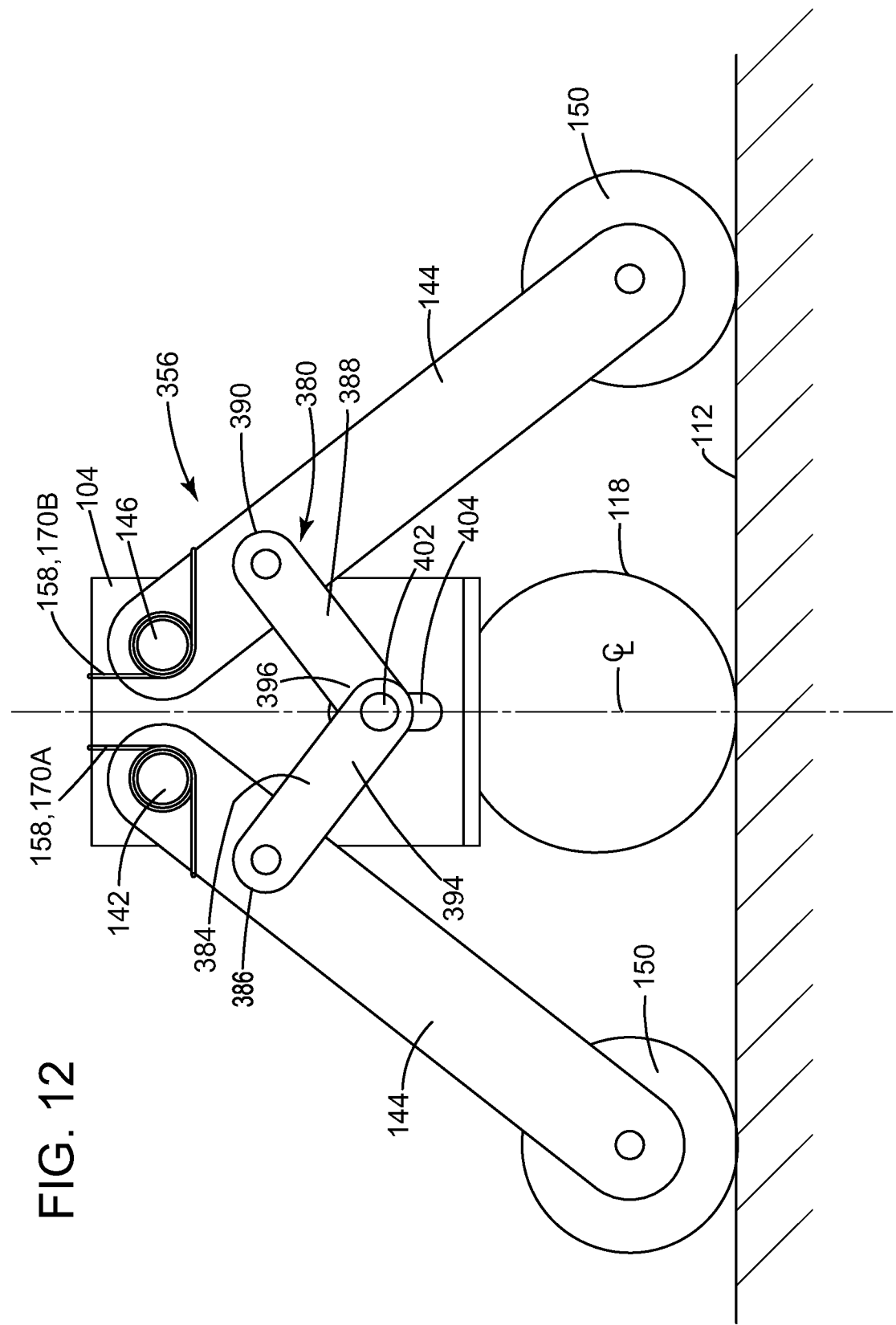
FIG. 12 shows a schematic side view of a suspension according to additional embodiments of the disclosure.
Figure 13:
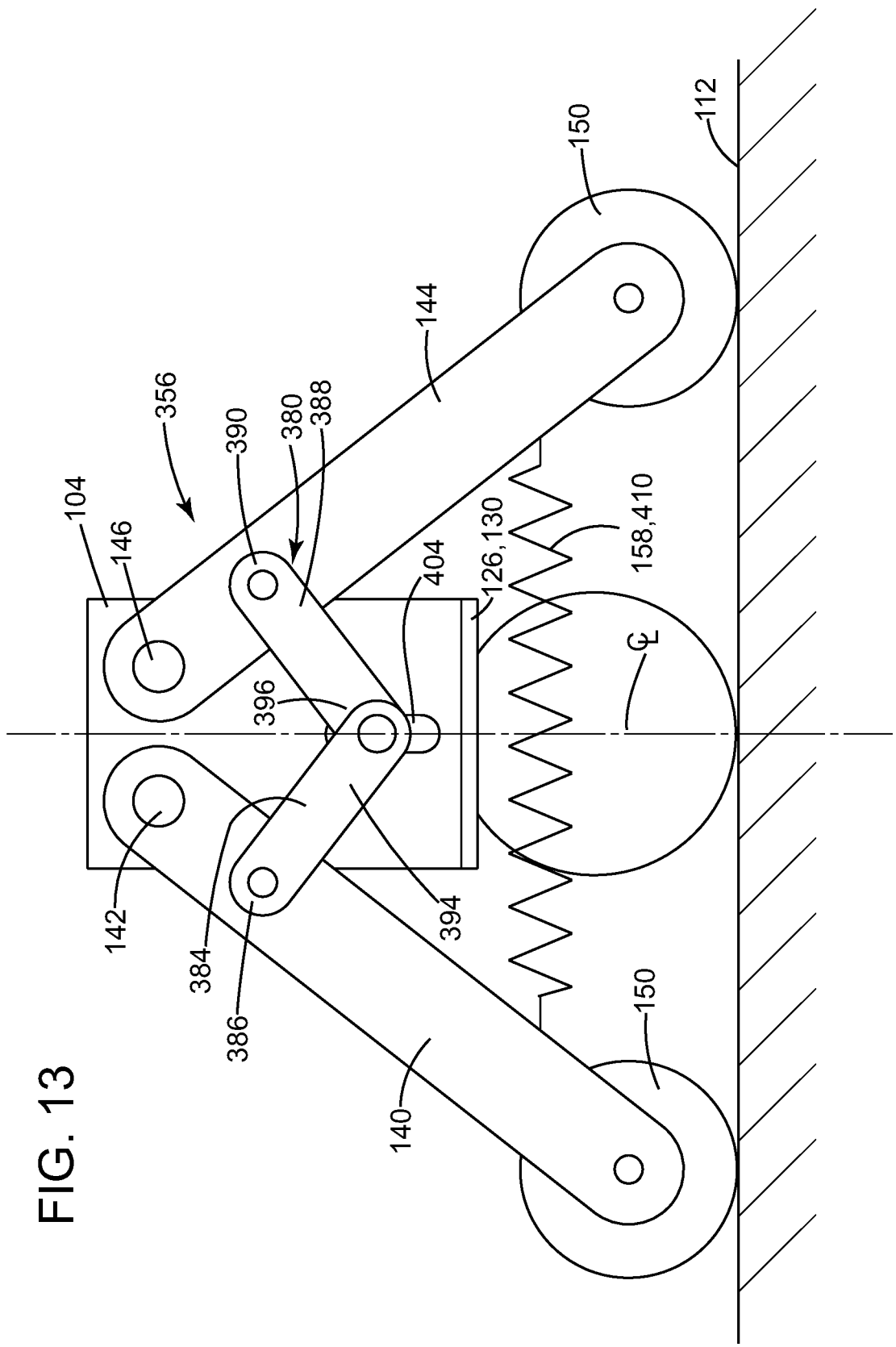
FIG. 13 shows a schematic side view of a suspension according to alternative embodiments of the disclosure.

FIG. 12 shows the FIG. 11 coupler embodiment on surface 112 that is generally planar, and with surface contacting element 150 in the form of a (non-magnetic) wheel. In contrast to FIGS. 9-11, biasing element 158 in FIG. 12 includes a pair of torsion springs 170A, 170B, as described herein. Here, biasing element 158 is operatively coupled (directly) to first and second support legs 140, 144 to bias the legs pivotally toward contact with surface 112, i.e., away from body 104. More particularly, biasing element 158 includes a first torsion spring 170A operatively coupled to bias first support leg 140 toward contact with surface 112, and a second torsion spring 170B operatively coupled to bias second support leg 144 toward contact with surface 112.

FIG. 13 shows an embodiment of a coupler 356, similar to FIG. 12, in which biasing element 158 is also operatively coupled (directly) to first and second support legs 140, 144 to bias the legs pivotally toward contact with surface 112. In FIG. 13, biasing element includes a tension spring 410 operatively coupled to first support leg 140 and second support leg 144 to bias both support legs toward contact with surface 112.

While a number of couplers 156, 256, 356 have been described herein, a wide variety of other couplers that cause pivotal movement of one of the support legs to be mirrored in the other support leg may be used, and are considered within the scope of the disclosure. It will be recognized that the dimensions of members and positioning of coupling thereof in couplers 156, 256, 356 may be customized to achieve the desired transmission of force.

In operation, autonomous vehicle 100 is suspended, i.e., supported, on surface 112 using suspension 102. Operation of di-wheel drive 110 is controlled to control movement of autonomous vehicle 100. Suspension 102 maintains a centerline CL extending equidistantly between first and second pivot points 142, 146 perpendicular to surface 112 as the first and second support leg 140, 144 pivot during movement of the autonomous vehicle.

Embodiments of the disclosure provide an autonomous vehicle, and a suspension therefor, that is smaller than prior autonomous vehicles but allows full maneuverability on surfaces that are convex and with small radii, e.g., 100 millimeters, compared to conventional systems that are limited to minimum 200 mm radius. The smaller size enables use of the autonomous vehicle with a drone for delivery to difficult to reach locations. The autonomous vehicle is also more robust having eliminated complex or divided mechanisms and sensor couplings common in the prior art.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An autonomous vehicle, comprising: a body; a di-wheel drive comprising a first wheel and a second wheel operatively coupled to the body; a suspension including: a first support leg pivotally coupled to the body of the autonomous vehicle at a first pivot point between the first and second drive wheel units, the first support leg extending in a first direction from the body, a second support leg pivotally coupled to the body of the autonomous vehicle at a second pivot point, the second support leg extending in a second direction from the body that is substantially opposite to the first direction, wherein each support leg includes a surface contacting element to contact a surface such that the di-wheel drive and each support leg support the autonomous vehicle on the surface, a coupler coupling the first support leg and the second support leg, the coupler causing pivotal movement of one of the support legs to be mirrored in the other support leg, and a biasing element operatively coupled to at least one of the coupler, the first support leg, and the second support leg to bias the first support leg and the second support leg pivotally toward contact with the surface; and a controller operatively coupled to the di-wheel drive to control movement of the autonomous vehicle.

2. The autonomous vehicle of claim 1, wherein the coupler includes a mechanical linkage operatively coupling the first support leg and the second support leg.

3. The autonomous vehicle of claim 1, wherein the biasing element includes at least one of: a torsion spring biasing at least one of the support legs, a magnet on an end of each of the support legs that contacts the surface, a tension spring coupling the support legs, and a compression spring between the body and at least one of the support legs.

4. The autonomous vehicle of claim 1, wherein the di-wheel drive includes a first magnetic, drive wheel unit and a second magnetic, drive wheel unit, each drive wheel unit having a drive axis, and wherein the first direction and the second direction are perpendicular to the drive axis of each drive wheel unit.

5. The autonomous vehicle of claim 1, further comprising a sensor mounted to an underside of the body.

6. The autonomous vehicle of claim 5, wherein a centerline extends equidistantly between the first and second pivot points and through the sensor mounted to the underside of the body, and
wherein the coupler causes the first support leg and the second support leg to maintain the centerline perpendicular to the surface as the first and second support leg pivot during movement of the autonomous vehicle.

7. The autonomous vehicle of claim 1, wherein the coupler includes a first gear on the first support leg and a second gear on the second support leg, wherein the first gear meshes with the second gear causing the pivotal movement of one of the support legs to be mirrored in the other support leg.

8. The autonomous vehicle of claim 1, wherein the first and second pivot point share a common axis, and wherein the coupler includes:
a first arm pivotally coupled at a first end thereof to the first support leg at a distance from the common axis;
a second arm pivotally coupled at a first end thereof to the second support leg at the distance from the common axis; and
an arm connection member pivotally coupled to a second end of the first arm and pivotally coupled to a second end of the second arm, and
wherein the biasing element is operatively coupled to the arm connection member to bias the first and second support legs pivotally toward contact with the surface.

9. The autonomous vehicle of claim 1, wherein the first and second pivot point share a common axis, and wherein the coupler includes:
a first arm pivotally coupled at a first end thereof to the first support leg at a distance from the common axis;
a second arm pivotally coupled at a first end thereof to the second support leg at the distance from the common axis; and
an arm connection guide pivotally coupling a second end of the first arm to a second end of the second arm, the arm connection guide positioned in a linear guide, and
wherein the biasing element is operatively coupled to the arm connection guide to bias the arm connection guide linearly to bias the first and second support legs pivotally toward contact with the surface.

10. The autonomous vehicle of claim 1, wherein the coupler includes:
a first arm pivotally coupled at a first end thereof to the first support leg at a distance from the first pivot point;
a second arm pivotally coupled at a first end thereof to the second support leg at the distance from the second pivot point; and
an arm connection guide pivotally coupling the first arm and the second arm, the arm connection guide positioned in a linear guide.

11. The autonomous vehicle of claim 10, wherein the biasing element is operatively coupled to the arm connection guide to bias the arm connection guide linearly to bias the first and second support legs pivotally toward contact with the surface.

12. The autonomous vehicle of claim 10, wherein the biasing element is operatively coupled to the first and second support legs to bias the first and second support legs pivotally toward contact with the surface,
wherein the biasing element includes one of:
a first torsion spring operatively coupled to bias the first support leg toward contact with the surface, and a second torsion spring operatively coupled to bias the second support leg toward contact with the surface; and
a tension spring operatively coupled to the first support leg and the second support leg to bias both support legs toward contact with the surface.

13. A suspension for an autonomous vehicle having a di-wheel drive, the suspension comprising:
a first support leg pivotally coupled to a body of the autonomous vehicle at a first pivot point, the first support leg extending in a first direction from the body;
a second support leg pivotally coupled to the body of the autonomous vehicle at a second pivot point, the second support leg extending in a second direction from the body that is substantially opposite to the first direction, wherein each support leg includes a surface contacting element to contact a surface such that the di-wheel drive and each support leg support the autonomous vehicle on the surface;
a coupler coupling the first support leg and the second support leg, the coupler causing pivotal movement of one of the support legs to be mirrored in the other support leg; and
a biasing element operatively coupled to at least one of the coupler, the first support leg and the second support leg to bias the first support leg and the second support leg pivotally toward contact with the surface,
wherein a centerline extends equidistantly between the first and second pivot points and through a sensor mounted to an underside of the body, and
wherein the coupler causes the first support leg and the second support leg to maintain the centerline perpendicular to the surface as the first and second support leg pivot during movement of the autonomous vehicle.

14. The suspension of claim 13, wherein the biasing element includes at least one of: a torsion spring biasing at least one of the support legs, a magnet on an end of each of the support legs that contact the surface, a tension spring coupling the support legs, and a compression spring between the body and at least one of the support legs.

15. The suspension of claim 13, wherein the coupler includes a first gear on the first support leg and a second gear on the second support leg, wherein the first gear meshes with the second gear, causing the pivotal movement of one of the support legs to be mirrored in the other support leg.

16. The suspension of claim 13, wherein the first and second pivot point share a common axis, and wherein the coupler includes:
a first arm pivotally coupled at a first end thereof to the first support leg at a distance from the common axis;
a second arm pivotally coupled at a first end thereof to the second support leg at the distance from the common axis; and
an arm connection member pivotally coupled to a second end of the first arm and pivotally coupled to a second end of the second arm, and wherein the biasing element is operatively coupled to the arm connection member to bias the first and second support legs pivotally toward contact with the surface.

17. The suspension of claim 13, wherein the first and second pivot point share a common axis, and wherein the coupler includes:
a first arm pivotally coupled at a first end thereof to the first support leg at a distance from the common axis;
a second arm pivotally coupled at a first end thereof to the second support leg at the distance from the common axis; and
an arm connection guide pivotally coupling a second end of the first arm to a second end of the second arm, the arm connection guide positioned in a linear guide, and
wherein the biasing element is operatively coupled to the arm connection guide to bias the arm connection guide linearly to bias the first and second support legs pivotally toward contact with the surface.

18. The suspension of claim 13, wherein the coupler includes:
a first arm pivotally coupled at a first end thereof to the first support leg at a distance from the first pivot point;
a second arm pivotally coupled at a first end thereof to the second support leg at the distance from the second pivot point; and
an arm connection guide pivotally coupling the first arm and the second arm, the arm connection guide positioned in a linear guide,
wherein the biasing element is operatively coupled to the arm connection guide to bias the arm connection guide linearly to bias the first and second support legs pivotally toward contact with the surface.

19. The suspension of claim 13, wherein the biasing element is operatively coupled to the first and second support legs to bias the first and second support legs pivotally toward contact with the surface, wherein the biasing element includes one of:
a first torsion spring operatively coupled to bias the first support leg toward contact with the surface, and a second torsion spring operatively coupled to bias the second support leg toward contact with the surface; and
a tension spring operatively coupled to the first support leg and the second support leg to bias both support legs toward contact with the surface.

20. A method, comprising: suspending an autonomous vehicle including a body and a di-wheel drive comprising a first wheel and a second wheel operatively coupled to the body on a surface using a suspension, the suspension including: a first support leg pivotally coupled to the body of the autonomous vehicle at a first pivot point between the first and second wheel, the first support leg extending in a first direction from the body, a second support leg pivotally coupled to the body of the autonomous vehicle at a second pivot point, the second support leg extending in a second direction from the body that is substantially opposite to the first direction, wherein each support leg includes a surface contacting element to contact a surface such that the di-wheel drive and each support leg support the autonomous vehicle on the surface, a coupler coupling the first support leg and the second support leg, the coupler causing pivotal movement of one of the support legs to be mirrored in the other support leg, and a biasing element operatively coupled to at least one of the coupler, the first support leg, and the second support leg to bias the first support leg and the second support leg pivotally toward contact with the surface; and controlling operation of the di-wheel drive to control movement of the autonomous vehicle, wherein the suspension maintains a centerline extending equidistantly between the first and second pivot points perpendicular to the surface as the first and second support leg pivot during movement of the autonomous vehicle.

* * * * *